United States Patent
Peterson et al.

(10) Patent No.: US 10,051,128 B2
(45) Date of Patent: Aug. 14, 2018

(54) REROUTING ELECTRONIC COMMUNICATIONS TO TRUSTED USER'S DEVICE WHILE A PRIMARY USER IS OCCUPIED

(71) Applicant: LENOVO Enterprise Solutions (Singapore) PTE. LTD., New Tech Park (SG)

(72) Inventors: Nathan J. Peterson, Oxford, NC (US); Gary D. Cudak, Wake Forest, NC (US); Amy L. Rose, Chapel Hill, NC (US); John S. Crowe, Durham, NC (US); Bryan L. Young, Tualatin, OR (US); Jennifer J. Lee-Baron, Morrisville, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/370,325

(22) Filed: Dec. 6, 2016

(65) Prior Publication Data

US 2018/0159984 A1    Jun. 7, 2018

(51) Int. Cl.
*H04M 3/54*    (2006.01)
*H04W 4/02*    (2018.01)
(Continued)

(52) U.S. Cl.
CPC ......... *H04M 3/541* (2013.01); *H04M 1/6075* (2013.01); *H04W 4/023* (2013.01);
(Continued)

(58) Field of Classification Search
CPC ....... H04W 4/025; H04W 4/046; H04W 4/14; H04W 36/0055; H04W 36/0083;
(Continued)

(56) References Cited

U.S. PATENT DOCUMENTS

| 2008/0120421 A1* | 5/2008 | Gupta .................... G06Q 10/10 709/229 |
| 2008/0120692 A1* | 5/2008 | Gupta ................. H04L 65/1096 726/1 |

(Continued)

OTHER PUBLICATIONS

Google,Re: automatically detect that I am driving my car, in that case forward all incoming calls (and/or SMS) to my OEM car phone, https://groups.google.com/forum/#!topic/tasker/wPOeL-caoaU, Last visited Sep. 27, 2016.

*Primary Examiner* — Jean Gelin
(74) *Attorney, Agent, or Firm* — Kunzler, PC

(57) ABSTRACT

An apparatus for rerouting electronic communication is disclosed. A method and computer program product also perform the functions of the apparatus. The apparatus includes a process and a memory that stores code executable by the processor to detect that a primary user is occupied, intercept an electronic communication directed to a portable communication device of the primary user, detect that a portable communication device of a trusted user on a list of one more trusted users is in proximity to the primary user, and reroute the electronic communication to the portable communication device of the trusted user, where the trusted user is determined to be in proximity with the primary user.

19 Claims, 5 Drawing Sheets

(51) Int. Cl.
*H04M 1/60* (2006.01)
*H04W 68/00* (2009.01)
*H04W 88/02* (2009.01)
*H04W 4/00* (2018.01)
*H04W 4/80* (2018.01)

(52) U.S. Cl.
CPC ...... *H04W 68/005* (2013.01); *H04M 2250/10* (2013.01); *H04W 4/008* (2013.01); *H04W 4/80* (2018.02); *H04W 88/02* (2013.01)

(58) Field of Classification Search
CPC ..... H04W 36/08; H04W 48/08; H04W 4/005; H04W 4/008; H04W 12/06; H04W 12/08
USPC ... 455/414.1, 410, 411, 417, 445, 41.2, 466, 455/569.1, 569.2, 575.9
See application file for complete search history.

(56) References Cited

U.S. PATENT DOCUMENTS

| | | | |
|---|---|---|---|
| 2009/0279680 A1* | 11/2009 | Chavez | H04M 3/42229 379/201.02 |
| 2010/0293239 A1* | 11/2010 | Cross | H04L 12/581 709/206 |
| 2013/0029650 A1* | 1/2013 | Xiao | H04W 4/027 455/417 |
| 2014/0172990 A1* | 6/2014 | Wan | H04W 4/025 709/206 |
| 2015/0237052 A1* | 8/2015 | Brique | H04L 63/10 726/1 |
| 2015/0358471 A1* | 12/2015 | Roth | B60K 37/00 455/417 |
| 2016/0205254 A1* | 7/2016 | Luers | H04M 3/5232 379/265.14 |

* cited by examiner

REROUTING ELECTRONIC COMMUNICATIONS TO TRUSTED USER'S DEVICE WHILE A PRIMARY USER IS OCCUPIED

FIELD

The subject matter disclosed herein relates to portable communication devices and more particularly relates to use of portable communication devices during times when the user is occupied.

BACKGROUND

Distraction while driving is a growing issue. Portable communication devices, such as cellular phones, contribute to distracted driving. Some applications block text messaging, emails, and other communication with the portable communication device while driving. However, blocking communication from portable communication devices while driving may prevent important messages from reaching the user.

BRIEF SUMMARY

An apparatus for rerouting electronic communication is disclosed. A method and computer program product also perform the functions of the apparatus. The apparatus includes a process and a memory that stores code executable by the processor to detect that a primary user is occupied, intercept an electronic communication directed to a portable communication device of the primary user, detect that a portable communication device of a trusted user on a list of one more trusted users is in proximity to the primary user, and reroute the electronic communication to the portable communication device of the trusted user, where the trusted user is determined to be in proximity with the primary user.

The method for rerouting electronic communication includes detecting, by use of a processor, that a primary user is occupied, intercepting, by use of a processor, an electronic communication directed to a portable communication device of the primary user, detecting, by use of a processor, that a portable communication device of a trusted user on a list of one more trusted users is in proximity to the primary user, and rerouting, by use of a processor, the electronic communication to the portable communication device of the trusted user, where the trusted user is determined to be in proximity with the primary user.

The computer program product for rerouting electronic communication includes a computer readable storage medium that stores code executable by a processor. The executable code includes code to perform detecting that a primary user is occupied, intercepting an electronic communication directed to a portable communication device of the primary user, detecting that a portable communication device of a trusted user on a list of one more trusted users is in proximity to the primary user, and rerouting the electronic communication to the portable communication device of the trusted user, where the trusted user is determined to be in proximity with the primary user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
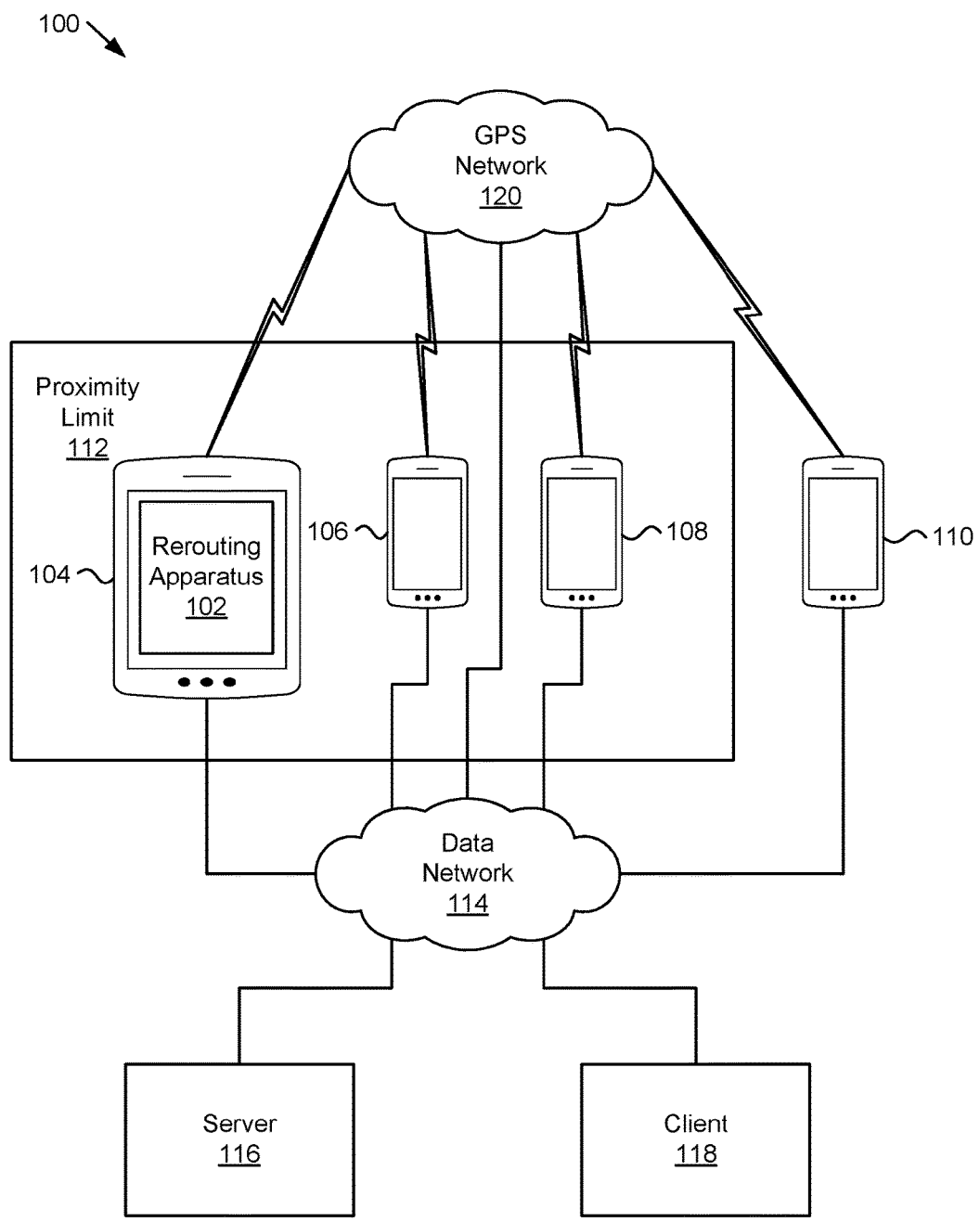
FIG. 1 is a schematic block diagram illustrating one embodiment of a system for rerouting electronic communication.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for rerouting electronic communication is disclosed. A method and computer program product also perform the functions of the apparatus. The apparatus includes a process and a memory that stores code executable by the processor to detect that a primary user is occupied, intercept an electronic communication directed to a portable communication device of the primary user, detect that a portable communication device of a trusted user on a list of one more trusted users is in proximity to the primary user, and reroute the electronic communication to the portable communication device of the trusted user, where the trusted user is determined to be in proximity with the primary user.

In one embodiment, the code is further executable by the processor to establish the list of one or more trusted users, where each trusted user has a portable communication device separate from a primary user's portable communication device. In another embodiment, establishing the list of trusted users includes receiving input from the primary user that identifies trusted users. In another embodiment, establishing the list of trusted users includes receiving input from the primary user that links each trusted user to one or more identifiers, where each identifier is associated with a communication method for rerouting the electronic communication to the trusted user's portable communication device.

In one embodiment, detecting that the primary user is occupied includes detecting that the primary user is driving a vehicle. In another embodiment, detecting that the primary user is driving a vehicle includes using information from a global positioning satellite ("GPS") system, using information from one or more wireless networks and/or determining that the portable communication device is connected to a hands-free system of the vehicle. In another embodiment, detecting that the primary user is occupied includes detecting that the primary user's portable communication device is in a do not disturb mode and/or is being used in a telephone call.

In one embodiment, detecting that the trusted user is in proximity to the primary user includes using information from a GPS system and/or determining that the primary user's portable communication device and the trusted user's portable communication device are connected with a short-range wireless network. In another embodiment, the trusted user receiving the electronic communication being in proximity to the primary user includes being within a proximity limit of the primary user. In another embodiment, the code is further executable by the processor to establish a priority among the trusted users on the list of one or more trusted users. In the embodiment, rerouting the electronic communication to a trusted user on the list of one or more trusted users includes rerouting the electronic communication to a highest priority trusted user in proximity to the primary user.

In one embodiment, the code is further executable by the processor to notify the trusted user receiving the electronic communication that the electronic communication is intended for the primary user. In another embodiment, the code is further executable by the processor to notify a sender of the electronic communication a notification that the electronic communication has been rerouted to a user other than the primary user.

A method for rerouting electronic communication includes detecting, by use of a processor, that a primary user is occupied, intercepting, by use of a processor, an electronic communication directed to a portable communication device of the primary user, detecting, by use of a processor, that a portable communication device of a trusted user on a list of one more trusted users is in proximity to the primary user, and rerouting, by use of a processor, the electronic communication to the portable communication device of the trusted user, where the trusted user is determined to be in proximity with the primary user.

In one embodiment, detecting that the primary user is occupied includes detecting that the primary user is driving a vehicle. In another embodiment, detecting that the trusted user is in proximity to the primary user includes using information from a GPS system and/or determining that the primary user's portable communication device and the trusted user's portable communication device are connected with a short-range wireless network. In another embodiment, the trusted user receiving the electronic communication being in proximity to the primary user includes being within a proximity limit of the primary user. In another embodiment, the code is further executable by the processor to establish a priority among the trusted users on the list of one or more trusted users, where rerouting the electronic communication to a trusted user on the list of one or more trusted users includes sending the electronic communication to a highest priority trusted user in the proximity to the primary user.

In one embodiment, the code is further executable by the processor to notify the trusted user receiving the electronic communication that the electronic communication is intended for the primary user. In another embodiment, the code is further executable by the processor to notify a sender of the electronic communication a notification that the electronic communication has been rerouted to a user other than the primary user.

A computer program product for rerouting electronic communication includes a computer readable storage medium that stores code executable by a processor. The executable code includes code to perform detecting that a primary user is occupied, intercepting an electronic communication directed to a portable communication device of the primary user, detecting that a portable communication device of a trusted user on a list of one more trusted users is in proximity to the primary user, and rerouting the electronic communication to the portable communication device of the trusted user, where the trusted user is determined to be in proximity with the primary user.

FIG. 1 is a schematic block diagram illustrating one embodiment of a system 100 for rerouting electronic communication. The system 100 includes a rerouting apparatus 102 in a primary portable communication device 104, trusted portable communication devices 106, 108, 110, a proximity limit 112, a data network 114, a server 116, a client 118 and a global positioning satellite ("GPS") network 120, which are described below.

The system 100 includes a rerouting apparatus 102 that reroutes electronic communications intended for a primary user of the primary portable communication device 104 to a trusted user of a trusted portable communication device (e.g. 106), for example, when the primary user is occupied while driving, taking a phone call, etc. A trusted portable communication device 106, 108, 110 is a device used by a trusted user. A primary portable communication device 104 is a device used by the primary user. The primary user is a user that is sent an electronic communication that may be rerouted because the primary user is occupied. Being occupied may include driving, using equipment, or other task that may be more dangerous if the primary user receives and views and/or listens to the electronic communication.

Being occupied may also include talking with another person on a telephone call, video chat, etc. where the primary user may be unable to conveniently receive the electronic communication. Having a trusted user in proximity to the primary user receive the electronic communication may be useful so that the trusted user may deal with the electronic communication and then relay information to the primary user in a manner safer and/or more convenient than the primary user dealing with the electronic communication directly. The electronic communication is routed to a trusted portable communication device 106, 108, 110 of a trusted user. The rerouting apparatus 102 detects that the primary user is occupied and the reroutes the electronic communication to the trusted user. The rerouting apparatus 102 is described in more detail with regard to the apparatuses 200, 300 of FIGS. 2 and 3.

The system 100 includes a primary portable communication device 104 and trusted portable communication devices 106, 108, 110, which are typically portable by a user. The portable communication devices 104, 106, 108, 110 are connected to a server 116 and/or each other, as well as to other communication devices over a wireless connection. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada. The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

The portable communication devices 104, 106, 108, 110 may include mobile telephones, smartphones, smart watches, tablets, gaming devices, laptop computers, vehicle communication systems, or other computing devices capable of receiving and/or sending an electronic communication. Typically, a portable communication device (e.g. 104, 106, 108, 110) includes a processor, but may also include devices with an FPGA or other programmable hardware device, which may also be termed herein as a "processor." An electronic communication may include voice communications over a telephone network, such as a cellular network, emails, short message service ("SMS") messages (i.e. "text messages"), photographs, videos, combinations of the above-mentioned messages, and the like. The electronic communications include any communication sent over a data network 114.

The system 100 includes a data network 114 and may include a GPS network 120. The data network 114 is depicted as a single network, but may include multiple connected or independent networks. For example, the portable communication devices 104, 106, 108, 110 may include one or more cellular telephone networks that allow the portable communication devices 104, 106, 108, 110 to communicate with each other where the cellular network(s) may include wireless connections as well as wired connections, the Internet, etc. The portable communication devices 104, 106, 108, 110 may also be connected to a GPS network 120, which may be independent of the cellular network(s). The GPS network 120 may be used for determining location of the portable communication devices 104, 106, 108, 110 and may communicate location information as well as other information related to the location information. The GPS network 120 may also communicate other electronic data and communications.

The portable communication devices 104, 106, 108, 110 may also be connected using another wireless protocol, such as WiFi. The portable communication devices 104, 106, 108, 110 may also include a short range wireless communication capability, such as Bluetooth, ANT+, etc. that is independent of the cellular network. The wireless connections may be used for different purposes. For example, while the cellular network(s) may be used for voice and data communications, the short-range wireless and/or GPS network 120 may be used to determine proximity between the primary portable communication device 104 and the trusted portable communication devices 106, 108, 110. The data network 114 and GPS network 120 may include cables, wireless devices, routers, cabling, switches, satellites and other equipment suitable for transmitting voice and data signals electronically.

The system 100 includes one or more servers 116. The server(s) 116 may be part of a cellular network or service, may be Internet servers, or other servers that facilitate communication between the portable communication devices 104, 106, 108, 110. A portable communication device (e.g. 104) may communicate with the trusted portable communication devices (e.g. 106, 108, 110) by establishing a wireless connection between the primary portable communication device 104 to a server 116 associated with the wireless connection, then communication between servers 116, and then a wireless connection between a server 116 associated with a trusted communication device (e.g. 106). The GPS network 120, in one embodiment, interacts with the data network 114, for example through a cellular network. One of skill in the art will recognize other ways that the portable communication devices 104, 106, 108, 110 may communicate wirelessly to transmit and receive electronic communications and to determine a location of each of the portable communication devices 104, 106, 108, 110.

The system 100 may also include a client 118 that may be connected to a server 116 over the data network 114. The client 118 may be used by the primary user or other user to input information for the rerouting apparatus 102, to receive electronic communications, and the like. The client 118 may be a laptop computer, a desktop computer, a tablet computer, a terminal, a workstation, and the like. The server 116 may be a desktop computer, a mainframe computer, a rackmounted computer in a data center, a laptop, a tablet, or other computing device with one or more processors.

The system 100 includes a proximity limit 112 that includes the primary portable communication device 104 and some trusted portable communication devices (e.g. 106, 108) and may exclude other trusted portable communication devices (e.g. 110). The proximity limit 112 may be established as a physical dimension. For example, the proximity limit 112 may be a certain radius or boundary from the primary portable communication device 104, which may be established using the GPS network 120 or other equipment that determines distance from the primary portable communication device 104.

In another embodiment, the proximity limit 112 may be established by some other means, such as devices with a signal strength limit. For example, where the portable communication devices 104, 106, 108, 110 have a Bluetooth capability, the proximity limit 112 may be a Bluetooth range of the primary portable communication device 104 so that trusted portable communication devices (e.g. 106, 108) in Bluetooth communication with the primary portable communication device 104 are within the proximity limit 112 and a trusted portable communication device 110 outside Bluetooth range of the primary portable communication device 104 is not in the proximity limit 112. Other short-range wireless communication networks, such as RFID may also be used. The proximity limit 112 is discussed further in relation to the apparatus 300 of FIG. 3.

Figure 2:
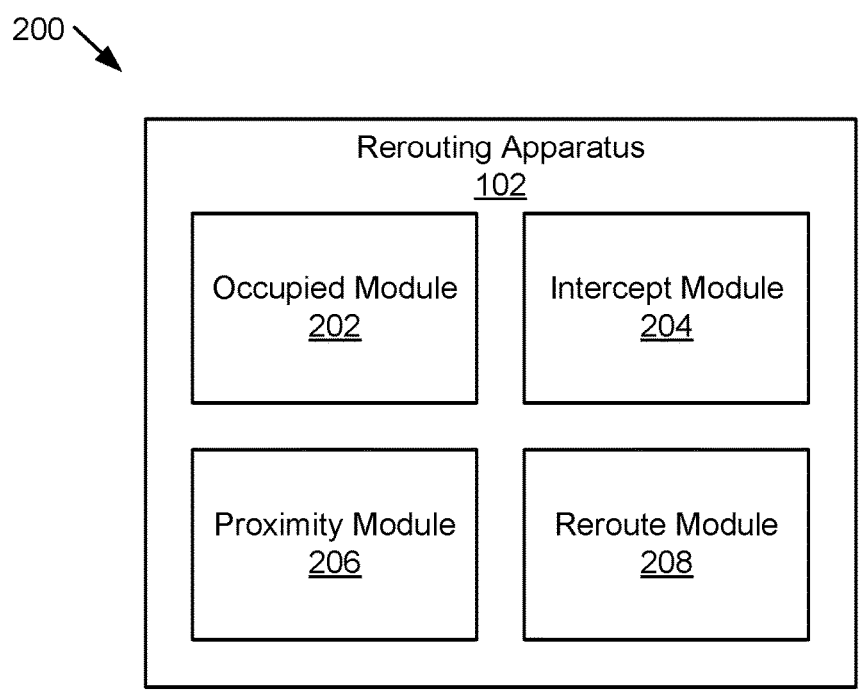
FIG. 2 is a schematic block diagram illustrating one embodiment of an apparatus for rerouting electronic communication.

FIG. 2 is a schematic block diagram illustrating one embodiment of an apparatus 200 for rerouting electronic communication. The apparatus 200 includes one embodiment of the rerouting apparatus 102 with an occupied module 202, an intercept module 204, a proximity module 206 and a reroute module 208, which are described below. While the modules 202-208 are depicted in the primary portable communication device 104, all or part of one or more of the modules 202-208 may be located in a server 116 or another location in the system 100.

The apparatus 200 includes an occupied module 202 that detects that a primary user is occupied. For example, the occupied module 202 may determine that the primary portable communication device 104 is moving at a rate of speed consistent with the primary user traveling in a vehicle. For example, the primary portable communication device 104 may use information from the GPS network 120, triangulation between cellular towers of a cellular network, an accelerometer, etc. to determine that the primary portable communication device 104 is moving at a speed consistent with travel in a vehicle. Information from the GPS network 120 may identify that the primary portable communication device 104 is in a roadway and may determine a rate of speed.

In another embodiment, the occupied module 202 may also detect that the primary portable communication device 104 is connected to a voice communication system of the vehicle where the primary user is located, such as a hands-free system of the vehicle, sensors, etc., which may signify that the primary user is driving the vehicle rather than being a passenger in the vehicle. For example, the primary portable communication device 104 being connected to a hands-free system of the vehicle may signify that the primary user is driving the vehicle. In another embodiment, one or more vehicle sensors and/or sensors in the primary portable communication device 104 may work independently or together to verify that the primary user is driving.

In another embodiment, the occupied module 202 may receive input from the primary user indicative of the primary user being the driver of the vehicle and may use GPS or other data to determine that the vehicle is moving or is in traffic. In another embodiment, the occupied module 202 may use a camera in the primary portable communication device 104 to determine that the primary user is driving. In another embodiment, the occupied module 202 uses echolocation to determine a position of the primary user to determine that the primary user is driving. The occupied module 202 may use primary user instructions, input from sensors, input from a camera, input from a microphone, data from the vehicle or other method to determine that the primary user is the driver and is occupied.

In another embodiment, the occupied module 202 determines that the primary user is occupied by determining that the primary user is operating a piece of equipment where there may be danger in the primary user being distracted by the electronic communication. For example, the primary user may be on a riding lawnmower and the occupied module may detect that the primary user is driving the lawnmower by sensing a lawnmower sound, by using a camera on the primary portable communication device 104, etc. The occupied module 402 may also detect that the primary user is occupied by using other types of equipment where reacting to the electronic message may endanger the primary user or others.

In another embodiment, the occupied module 202 determines that the primary user is occupied by determining that the primary user is on a telephone call on the primary portable communication device 104. In another embodiment, the occupied module 202 determines that the primary user has set a "do not disturb" mode on the primary portable communication device 104. In another embodiment, the occupied module 202 determines that the primary user is in a meeting, for example by interacting with a calendar and/or schedule program in the primary portable communication device 104. One of skill in the art will recognize other ways to determine that the primary user is occupied and other activities where the primary user is occupied.

In another embodiment, the occupied module 202 determines that the primary user is occupied by receiving input from the primary user. For example, the primary user may hear a notification of the electronic communication, such as a ringtone of a phone call, and may press a button, speak a command, etc. that signifies to the occupied module 202 that the primary user is occupied.

The apparatus 200 includes an intercept module 204 that intercepts an electronic communication directed to a portable communication device (e.g. 104) of the primary user. For example, the intercept module 204 may intercept a telephone call, text message, email, etc. directed to the primary user after the occupied module 202 determines that the primary user is occupied in an activity, such as driving. In one embodiment, the intercept module 204 interacts with a cellular telephone network capable of voice and/or data communication to intercept the electronic communication. In another embodiment, the intercept module 204 is on the primary portable communication device 104 and is capable of rerouting electronic communications, either by sending a copy or by sending the electronic communication without placing a copy on the primary portable communication device 104.

In one embodiment, the intercept module 204 prevents the electronic communication from reaching the primary portable communication device 104. In another embodiment, the intercept module 204 allows the electronic communication to be received by the primary user, but silences notification to the primary user, such as sound and/or visual notifications, so that the primary user is not distracted by the electronic communications but has access at a later time when the primary user is not occupied. For example, the intercept module 204 may prevent a telephone call or video call from producing a ring tone while rerouting the telephone/video call as described below. The intercept module 204, in another embodiment, allows an email, text message, video, etc. to be received by the primary portable communication device 104, but silences any audible notification and/or suppresses any visual notification on the primary portable communication device 104.

The apparatus 200 includes a proximity module 206 that detects that a portable communication device (e.g. 106) of a trusted user on a list of one more trusted users is in proximity to the primary user. The proximity module 206 may detect, for example, that the trusted portable communication device 106 is in a vehicle with the primary user and/or primary portable communication device 104, and is thus in proximity to the primary user. For example, the proximity module 206 may use information from the GPS network 120, information that the trusted portable communication device 106 is traveling at a same speed as the primary portable communication device 104 and close to the primary portable communication device 104, etc.

In another embodiment, the proximity module 206 determines that the trusted portable communication device 106 of the trusted user is linked to the primary portable communication device 104, for example over a short-range wireless connection, such as Bluetooth, ANT+, RFID, etc. A wireless connection between the devices 104, 106 may signify that the trusted user is in proximity to the primary user.

A trusted portable communication device 106 being in proximity to the primary user, in one embodiment, assumes that that the primary portable communication device 104 is with the primary user and may include various distances between the devices 104, 106. The various distances are situationally dependent. For example, being in proximity may include that the trusted user and the primary user are in the same vehicle for situations where the primary user and the trusted user are traveling in the vehicle. The trusted user being in another vehicle following the vehicle of the primary user may not be sufficient in this circumstance.

In another circumstance, where the primary user being occupied includes the primary user on a phone call, the primary user being in proximity to the trusted user may include a greater distance, such as the primary user and the trusted user being within the same room, the same residence, etc. For example, being in proximity may include a distance between the primary user and the trusted user such that the trusted user is able to quickly communicate with the primary user within a few seconds, for example, to relay an important message to the primary user that is talking on a phone call. One of skill in the art will recognize other situations and appropriate distances for the trusted user being in proximity to the primary user. The proximity module 206 may use GPS information from the GPS network 120, information from the data network 114, sensor information, etc. to determine the location of the trusted user and/or the trusted portable communication device 106 of the trusted user to determine proximity.

In one embodiment, the trusted user that receives the electronic communication being in proximity to the primary user includes being within a proximity limit 112 of the primary user. The proximity limit 112, in one embodiment, is as described above with respect to the system 100 of FIG. 1. In one embodiment, the primary user sets the proximity limit 112. In another embodiment, the proximity module 206 stores the proximity limit 112. In another embodiment, the primary user establishes more than one proximity limit 112, for example for various occupied states of the primary user. For example, one proximity limit 112 may be associated with driving and another proximity limit 112 may be associated with the primary user being occupied on a phone call. In another embodiment, the proximity module 206 stores a priority for each proximity limit 112. For example, the proximity limit 112 associated with driving may be lower than the proximity limit 112 associated with the primary user being on a phone call. One of skill in the art will recognize other proximity limits 112 and how to establish a proximity limit 112.

The apparatus 200 includes a reroute module 208 that reroutes the electronic communication to the portable communication device (e.g. 106) of the trusted user. The trusted user is determined to be in proximity with the primary user by the proximity module 206. Rerouting the electronic communication may be dependent on the type of electronic communication. For example, rerouting a phone call may include forwarding the phone call to the trusted portable communication device 106 of the trusted user. Rerouting a text message or email may include sending a copy of the text message or email to the trusted portable communication device 106 while keeping a copy on the primary portable communication device 104 while suppressing notification of the text message or email on the primary portable communication device 104.

Rerouting the electronic communication, in one embodiment, may be directed by action from the primary portable communication device 104. In another embodiment, rerouting the electronic communication may be by a cellular network or other network through with the electronic communication travels.

Figure 3:
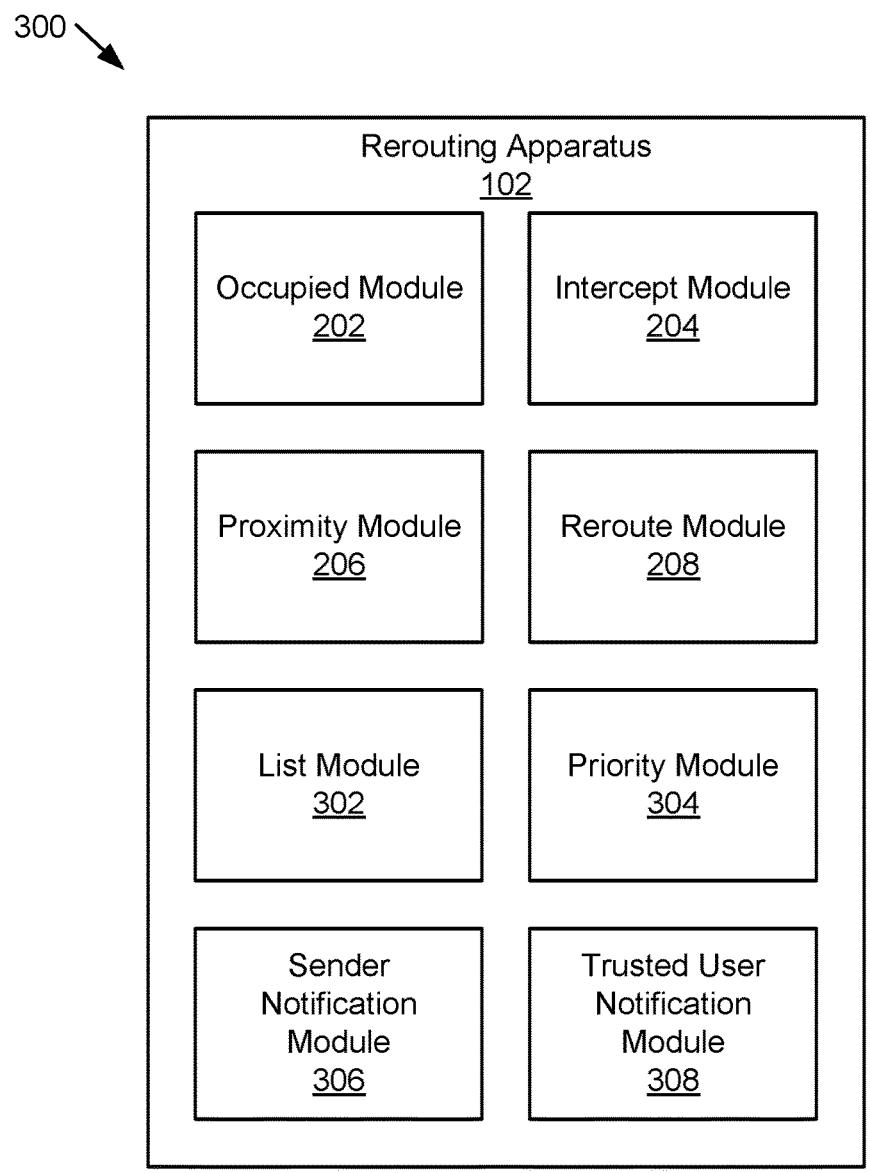
FIG. 3 is a schematic block diagram illustrating another embodiment of an apparatus for rerouting electronic communication.

FIG. 3 is a schematic block diagram illustrating another embodiment of an apparatus 300 for rerouting electronic communication. The apparatus 300 includes another embodiment of the rerouting apparatus 102 that includes an occupied module 202, an intercept module 204, a proximity module 206 and a reroute module 208, which are substantially similar to those described above in relation to the apparatus 200 of FIG. 2. In various embodiments, the apparatus 300 includes a list module 302, a priority module 304, a sender notification module 306 and/or a trusted user notification module 308, which are described below. While the rerouting apparatus 102 is depicted in the primary portable communication device 104 in FIG. 1, all or part of some or all of the modules 202-208, 302-308 may be located elsewhere. For example, the list module 302 may be located on a server 116.

The apparatus 300, in one embodiment, includes a list module 302 that establishes the list of one or more trusted users. Each trusted user has a portable communication device (e.g. 106, 108, 110) separate from a primary user's portable communication device 104. In one embodiment, the list module 302 receives input from the primary user to identify trusted users. The trusted users may be family members, close friends, traveling companions, business associates, and the like. The primary user may adjust the list of trusted users from time to time or may frequently change trusted users. For example, the primary user may use the list module 302 to choose one or more trusted users at the start of travel.

In some embodiments, the trusted users are temporary. For example, the list of trusted users may expire at the end of travel in a vehicle. In other embodiments, the list of trusted users is maintained until further action from the primary user. The list module 302, in one embodiment, establishes the list of trusted users by identifying contact information of each trusted user. In one embodiment, establishing the list of trusted users includes receiving input from the primary user that links each trusted user to one or more identifiers. Each identifier is associated with a communication method for rerouting the electronic communication to the trusted user's portable communication devices 106, 108, 110. For example, the list module 302 may store a phone number of a trusted user's portable communication device (e.g. 106, 108, 110), may store an email address, etc.

In another embodiment, the list module 302 identifies the trusted portable communication devices 106, 108, 110 of the trusted users. For example, the list module 302 may store a device identifier ("ID"), a network address, etc. of the trusted portable communication devices 106, 108, 110, such as a Bluetooth ID, an RFID tag, etc. so that the proximity module 206 may determine if the trusted portable communication devices 106, 108, 110 are in proximity to the primary user. The list module 302 may store any information of a trusted user useful for determining proximity of a trusted user and for rerouting the electronic message.

The apparatus 300, in some embodiments, includes a priority module 304 that establishes a priority among the one or more trusted users. The priority is used by the rerouting module 208 when rerouting the electronic communication. The rerouting module 208 reroutes the electronic communication to a highest priority trusted user in proximity to the primary user. For example, the proximity module 206 may determine that two trusted portable communication devices 106, 108 are in proximity to the primary user, such as within a proximity limit 112, and may send the electronic communication to the trusted user with the highest priority. For example, one trusted user may be a spouse and may have a higher priority than another trusted user that is a child of the primary user. Where both the spouse and child are in a vehicle with the primary user, and thus in proximity to the primary user, the rerouting module 208 may reroute the electronic communication to the spouse.

The priority module 304 may receive input from the primary user to arrange and to rearrange priority among trusted users. For example, the primary user may establish priority of one or more trusted users when adding or adjusting trusted users through the list module 302. In one embodiment, priority may take the form of an ordered list. In another embodiment, priority may take the form of priority tiers, such as a first tier, a second tier, etc. In the embodiment, where two trusted users are in proximity to the primary user and have a same priority, the rerouting module 208 may reroute the electronic communication to a trusted user that is closer to the primary user than the other trusted user. One of skill in the art will recognize other ways for the priority module 304 to establish priority of trusted users.

The apparatus 300, in some embodiments, includes a sender notification module 306 that notifies a sender of the electronic communication a notification that the electronic communication has been rerouted to a user other than the primary user. For example, where the electronic communication is a phone call, the sender notification module 306 may notify the caller that the phone call has been rerouted and may include an identification of the trusted user to which the phone call is rerouted. Where the electronic communication is a text message, email message, video, etc., the sender notification module 306 may send a return notification that informs the sender that the text message, email, video, etc. was rerouted and may identify the trusted user to which the electronic communication was sent. The sender notification module 306 may also send other information, such as a reason for the rerouting of the sender's electronic communication, that the primary user directed the rerouting, etc.

The apparatus 300, in some embodiments, includes a trusted user notification module 308 that notifies the trusted user receiving the electronic communication that the electronic communication is intended for the primary user. For example, where the electronic communication is a text message, the text message may include an addition that states that the text message is originally intended for the primary user. Where the electronic message is a phone call, a message may appear on the trusted portable communication device (e.g. 106) of the trusted user receiving the phone call where the message states that the phone call is intended for the primary user. Other forms of electronic communication may include similar messages or notifications that identify the rerouted electronic communication as being intended for the primary user.

Figure 4:
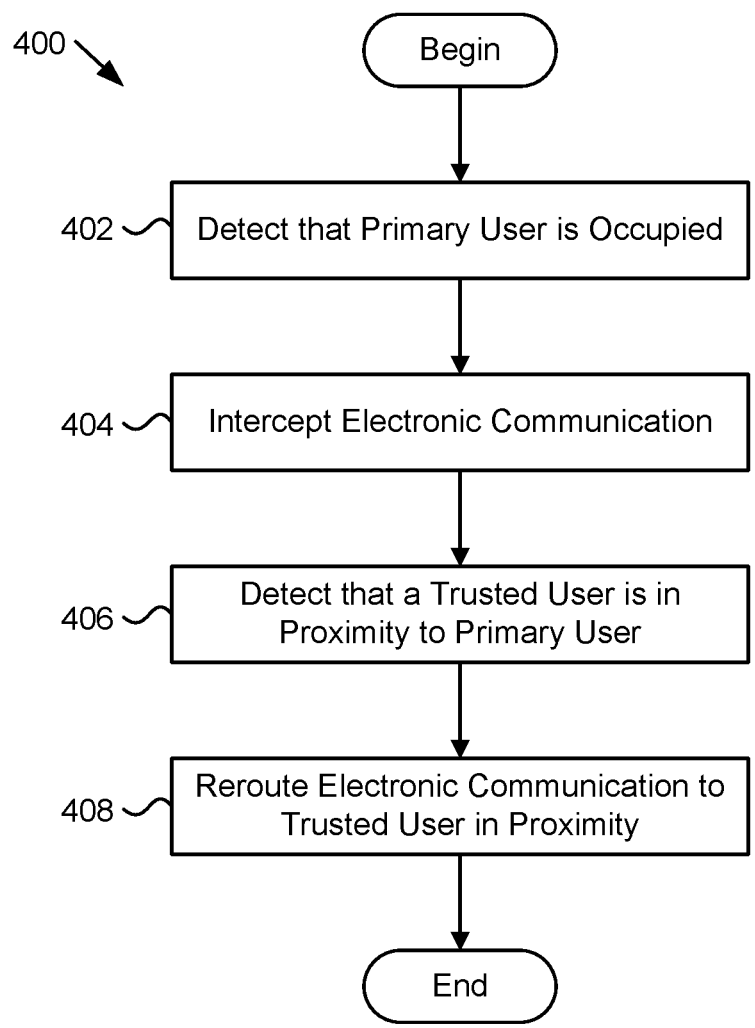
FIG. 4 is a schematic flow chart diagram illustrating one embodiment of a method for rerouting electronic communication.

FIG. 4 is a schematic flow chart diagram illustrating one embodiment of a method 400 for rerouting electronic communication. The method 400 begins and detects 402 that a primary user is occupied. For example, the method 400 may determine that the primary user is driving a vehicle. In another example, the method 400 determines that the primary user is occupied in a phone call, has enabled a "do not disturb" mode on the primary portable communication device 104, etc. The method 400 intercepts 404 an electronic communication directed to the portable communication device 104 of the primary user. For example, the method 400 may intercept a phone call, a text message, an email, a video clip, etc.

The method 400 detects 406 that a portable communication device (e.g. 106) of a trusted user on a list of one more trusted users is in proximity to the primary user. For example, the method 400 may use GPS information to determine that the trusted user is in proximity to the primary user. In another embodiment, the method 400 may determine proximity by determining that the trusted portable communication device 106 of the trusted user is connected to the primary portable communication device 104 over a wireless connection. The method 400 reroutes 408 the electronic communication to the portable communication device 106 of the trusted user that is in proximity with the primary user, and the method 400 ends. In various embodiments, the method 400 may use the occupied module 202, the intercept module 204, the proximity module 206 and/or the reroute module 208.

Figure 5:
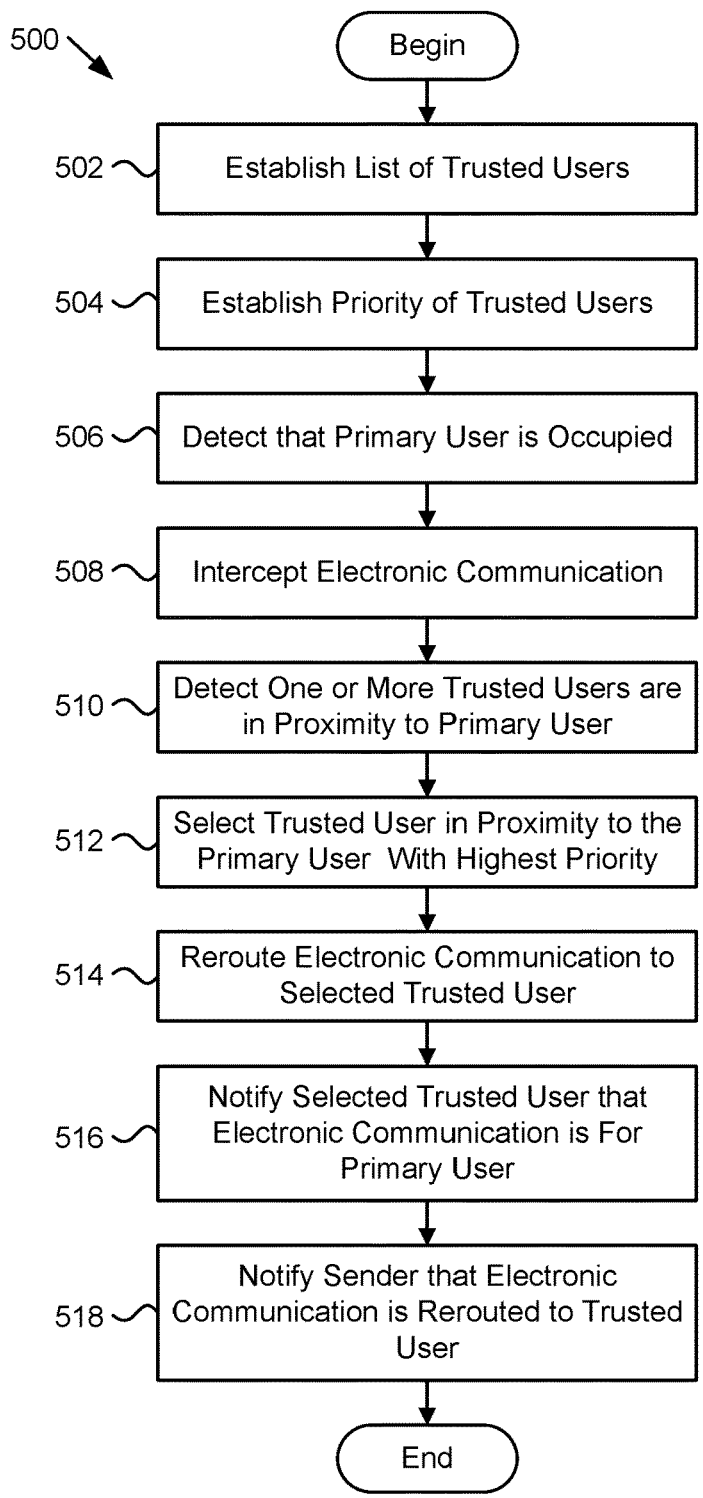
FIG. 5 is a schematic flow chart diagram illustrating another embodiment of a method for rerouting electronic communication.

FIG. 5 is a schematic flow chart diagram illustrating another embodiment of a method 500 for rerouting electronic communication. The method 500 begins and establishes 502 a list of one or more trusted users, where each trusted user has a portable communication device (e.g. 106, 108, 110) separate from a primary user's portable communication device 104, and optionally establishes 504 a priority among the one or more trusted users. The method 500 detects 506 that the primary user is occupied and intercepts an electronic communication directed to a portable communication device 104 of the primary user. The method 500 detects 510 one or more portable communication devices (e.g. 106, 108) of a trusted user on the list of one more trusted users is in proximity to the primary user. For example, the method 500 may detect 510 that one or more portable communication devices 106, 108 are within a proximity limit 112.

The method 500 selects 512 a trusted user's portable communication device (e.g. 106) in proximity to the primary user and with a highest priority and reroutes 514 the intercepted electronic communication to the selected trusted user's portable communication device 106. The method 500 optionally notifies 516 the selected trusted user that the electronic communication is for the primary user and optionally notifies 518 the sender of the electronic communication that the electronic communication is rerouted to the trusted user, and the method 500 ends. In various embodiments, the method 500 may use the occupied module 202, the intercept module 204, the proximity module 206, the reroute module 208, the list module 302, the priority module 304, the sender notification module 306 and/or the trusted user notification module 308.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a processor;
    a memory that stores code executable by the processor to:
        establish a list of one or more trusted users, each trusted user having a portable communication device separate from a primary user's portable communication device;
        detect that the primary user is occupied, wherein the primary user's portable communication device is in proximity to the primary user;
        intercept an electronic communication directed to the primary user's portable communication device;
        detect that the portable communication device of a trusted user on the list of one more trusted users is in proximity to the primary user's portable communication device;
        reroute the electronic communication to the portable communication device of the trusted user, the trusted user determined to be in proximity with the primary user; and
        notify a sender of the electronic communication a notification that the electronic communication has been rerouted to a user other than the primary user, the sender comprising a person.

2. The apparatus of claim 1, wherein establishing the list of one or more trusted users comprises receiving input from the primary user that identifies trusted users.

3. The apparatus of claim 2, wherein establishing the list of one or more trusted users comprises receiving input from the primary user that links each trusted user to one or more identifiers, each identifier associated with a communication method for rerouting the electronic communication to the trusted user's portable communication device.

4. The apparatus of claim 1, wherein detecting that the primary user is occupied comprises detecting that the primary user is driving a vehicle.

5. The apparatus of claim 4, wherein detecting that the primary user is driving a vehicle comprises determining that the portable communication device is connected to a hands-free system of the vehicle.

6. The apparatus of claim 4, wherein detecting that the primary user is driving a vehicle comprises one or more of:
    using information from a global positioning satellite ("GPS") system; and
    using information from one or more wireless networks.

7. The apparatus of claim 1, wherein detecting that the primary user is occupied comprises detecting that the primary user's portable communication device is one or more of in a do not disturb mode and is being used in a telephone call.

8. The apparatus of claim 1, wherein detecting that the trusted user is in proximity to the primary user comprises one or more of:
    using information from a GPS system; and
    determining that the primary user's portable communication device and the trusted user's portable communication device are connected with a short-range wireless network.

9. The apparatus of claim 1, wherein the trusted user receiving the electronic communication being in proximity to the primary user comprises being within a proximity limit of the primary user.

10. The apparatus of claim 1, wherein the code is further executable by the processor to establish a priority among the trusted users on the list of one or more trusted users, wherein rerouting the electronic communication to a trusted user on the list of one or more trusted users further comprises rerouting the electronic communication to a highest priority trusted user in proximity to the primary user.

11. The apparatus of claim 1, wherein the code is further executable by the processor to notify the trusted user receiving the electronic communication that the electronic communication is intended for the primary user.

12. A method comprising:
    establish a list of one or more trusted users, each trusted user having a portable communication device separate from a primary user's portable communication device;
    detecting, by use of a processor, that the primary user is occupied, wherein the primary user's portable communication device is in proximity to the primary user;
    intercepting, by use of a processor, an electronic communication directed to the portable communication device of the primary user;
    detecting, by use of a processor, that the portable communication device of a trusted user on the list of one more trusted users is in proximity to the primary user's portable communication device; and
    rerouting, by use of a processor, the electronic communication to the portable communication device of the trusted user, the trusted user determined to be in proximity with the primary user; and
    notifying a sender of the electronic communication a notification that the electronic communication has been rerouted to a user other than the primary user, the sender comprising a person.

13. The method of claim 12, wherein detecting that the primary user is occupied comprises detecting that the primary user is driving a vehicle.

14. The method of claim 13, wherein detecting that the primary user is driving a vehicle comprises determining that the portable communication device is connected to a hands-free system of the vehicle.

15. The method of claim 12, wherein detecting that the trusted user is in proximity to the primary user comprises one or more of:

using information from a GPS system; and determining that the primary user's portable communication device and the trusted user's portable communication device are connected with a short-range wireless network.

16. The method of claim 12, wherein the trusted user receiving the electronic communication being in proximity to the primary user comprises being within a proximity limit of the primary user.

17. The method of claim 12, wherein the code is further executable by the processor to establish a priority among the trusted users on the list of one or more trusted users, wherein rerouting the electronic communication to a trusted user on the list of one or more trusted users further comprises sending the electronic communication to a highest priority trusted user in the proximity to the primary user.

18. The method of claim 12, wherein the code is further executable by the processor to notify the trusted user receiving the electronic communication that the electronic communication is intended for the primary user.

19. A non-transitory program product comprising a computer readable storage medium that stores code executable by a processor, the executable code comprising code to perform:

establish a list of one or more trusted users, each trusted user having a portable communication device separate from a primary user's portable communication device;

detecting that the primary user is occupied, wherein the primary user's portable communication device is in proximity to the primary user;

intercepting an electronic communication directed to the portable communication device of the primary user;

detecting that the portable communication device of a trusted user on the list of one more trusted users is in proximity to the primary user's portable communication device; and rerouting the electronic communication to the portable communication device of the trusted user, the trusted user determined to be in proximity with the primary user; and notifying a sender of the electronic communication a notification that the electronic communication has been rerouted to a user other than the primary user, the sender comprising a person.

* * * * *